April 10, 1934.  E. R. WILCOX  1,954,339
MANIFOLDING ASSEMBLY
Filed Dec. 3, 1932
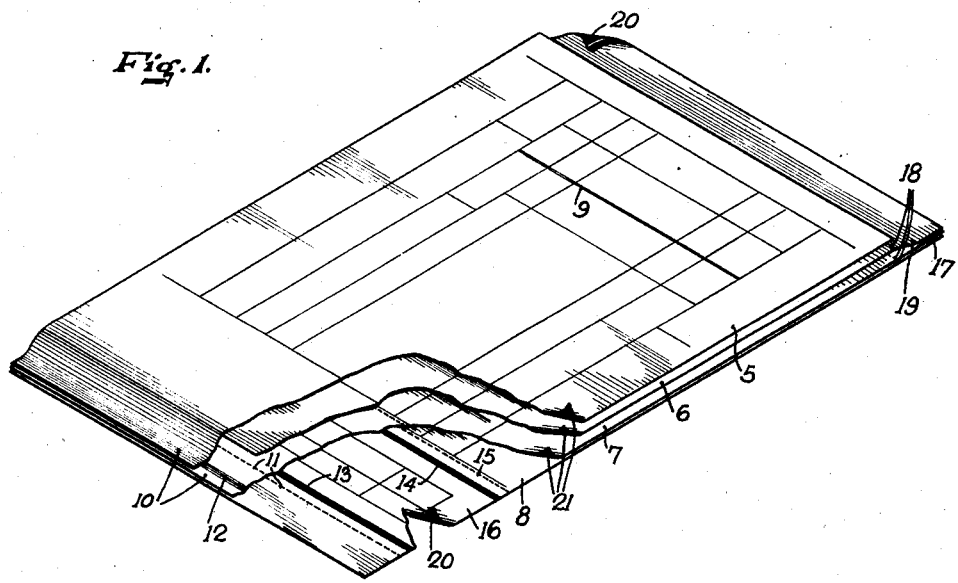
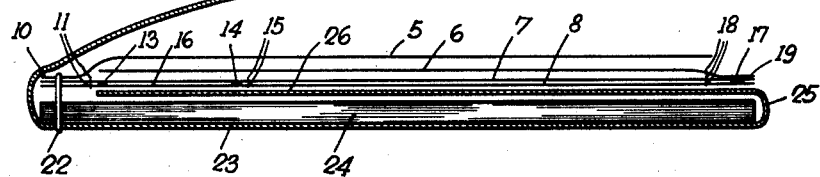
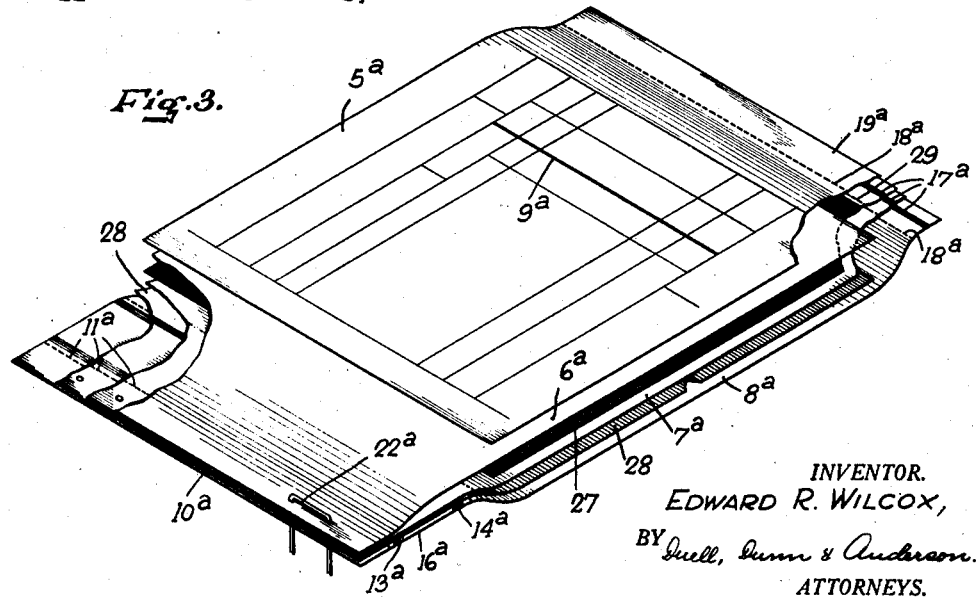
INVENTOR.
EDWARD R. WILCOX,
BY Duell, Dunn & Anderson.
ATTORNEYS.

Patented Apr. 10, 1934

1,954,339

UNITED STATES PATENT OFFICE 1,954,339

MANIFOLDING ASSEMBLY

Edward R. Wilcox, Oakland, Calif., assignor to Pacific Manifolding Book Company, Limited, Toronto, Ontario, Canada, a corporation of Ontario, Canada Application December 3, 1932, Serial No. 645,535

11 Claims. (Cl. 282—22)

This invention relates to improvements in manifolding inscription devices, and more particularly to an improved unitary manifolding assembly of manifolding leaves including record leaves and transfer material.

It is a general object of the invention to provide a unitary manifolding assembly embodying an improved arrangement of the manifolding leaves whereby, after inscription, certain of the leaves may remain attached together at remote parts thereof after other leaves have been detached from the assembly.

A more particular object of the invention is to provide an improved assembly of manifolding leaves whereby, after the inscriptions have been made and transferred to the different leaves and certain leaves have been detached, two or more leaves will remain attached together and be provided with attaching stubs or supports for attachment to an article or package so as to serve as a shipping or similar label.

Still another object of the invention is to provide in a manifolding assembly of the class mentioned, an improved arrangement of transfer material whereby the inscriptions are transferred to the underlying leaves and whereby supplemental inscriptions may be transferred between attached leaves after the removal of one or more of the inscribed leaves from the assembly.

According to another improved feature of the invention, the manifolding assembly is constructed to include two or more record leaves attached together at opposite marginal portions thereof so as to provide opposite attaching stubs for attachment to an article and being furthermore provided with weakened severance lines along each attaching stub for detachment of the inscribed leaves therefrom.

Another object is to provide an improved manifolding assembly capable of being bound with a multiplicity of similar assembles in a binding from which it may be detached after inscription thereof and subsequently utilized for attachment of a plurality of the inscribed leaves thereof to an article or package for the purpose of serving as a label to provide shipping instructions or the like.

A further object is to provide a unitary manifolding assembly having an improved arrangement for securing a plurality of inscribed leaves together to provide a composite label having attaching stubs or extensions and being provided with one or more transfer leaves bound into the assembly and arranged in an improved manner for selective separation of one of the transfer leaves from the assembly of record leaves.

Other objects of the invention will be in part pointed out in the following detailed disclosure of an illustrative but preferred embodiment of the invention and will be in part obvious in connection therewith.

The invention accordingly comprises the features of construction, combinations of elements, and arrangement of parts which will be exemplified in the construction hereinafter set forth and the scope of the application of which will be indicated in the claims.

For a more complete disclosure and understanding of the nature and objects of the invention, reference is had to the following detailed description of certain illustrative but preferred embodiments and to the accompanying drawing in which Figure 1 is a perspective view of a manifolding assembly embodying the invention, parts being broken away for clearness of disclosure and the leaves being shown as separated slightly for a similar purpose.

Fig. 2 is a longitudinal vertical section of a manifolding book or pad in which a multiplicity of the improved manifolding assemblies are bound, and Fig. 3 is a view similar to Fig. 1 showing a modified embodiment.

In describing the invention in detail, reference is first made to Fig. 1, disclosing a quadruplicate manifolding assembly. It is to be understood, however, that the assembly may include a smaller or greater number of leaves than herein disclosed; triplicate, quadruplicate, quintuplicate, or sets of any desired number of leaves may be constructed, and used, in accordance with particular requirements and in accordance with the invention.

As shown in Fig. 1, the manifolding assembly or set includes an original record leaf 5, a duplicate record leaf 6, a triplicate 7 and a quadruplicate 8 arranged in superposed manifolding relation with each other, each leaf being attached in the assembly. Each leaf may be provided with an appropriate blank form 9 which may, as in the present embodiment, be ruled for the reception of data forming shipping instructions.

The manifolding assembly is provided with a binding stub 10 to which certain of the leaves are attached and forming a support for holding the assembly either in a manifolding book or pad, as shown in Fig. 2, or in a clamp or other form of binding. It will be obvious that the sets may be kept separately from each other or in a pack of sets, or in a box, or an appropriate file. As shown, the binding stub 10 is provided by extensions of the record leaves 5, 7 and 8, the leaves 7 and 8 and also the original leaf 5 if desired being provided with transverse weakened severance lines 11 positioned between the bodies of the respective leaves and the binding stub extensions thereof. The record leaves 5 and 7 are attached to each other at the stub extensions thereof by means of a line of adhesive as indicated at 12, and if desired the leaves 7 and 8 may be similarly attached.

However, the record leaves 7 and 8 are attached to each other just inside of the severance lines 11 by means of lines of adhesive 13 and 14. These adhesive lines are shown as extending transversely and spaced apart longitudinally although, if desired, this entire area between these two lines of adhesive may be adhesively coated. As shown, the space between the two adhesive lines 13 and 14 may be utilized for inscription purposes on either or on both of the leaves 7 and 8.

Spaced inwardly from the weakened severance lines 11 are additional transverse severance lines 15 in each of the record leaves 7 and 8. The space or leaf section between the severance lines 11 and 15 provides an auxiliary or attaching stub 16 serving for attachment of certain of the leaves to an article or package as later more fully described.

At the opposite edge of the assembly to the binding stub 10, the record leaves 6, 7 and 8 are also attached together by lines of adhesive 17 interposed between the marginal portions of the leaves. Spaced inwardly a short distance from this attachment each of these record leaves is provided with a transverse weakened severance line 18 thus defining a second auxiliary or attaching stub 19 corresponding to and used for a similar purpose as the attaching stub 16. It will be observed that the original record leaf 5 has a free swinging edge opposite its attachment in the binding stub 10 and that the duplicate record leaf 6 has a free swinging end opposite its attachment in the attaching stub 19. With this arrangement, it will be clear that either the leaf 5 or the leaf 6 may be placed at the top of the assembly, these two leaves being readily interchangeable with each other. As indicated at 20, the lower surfaces of each of the attaching stubs 16 and 19 may be coated with an adhesive for attachment of certain of the leaves to the package. This may be in the form of dry adhesive to be moistened when the label is applied to the package, or the moist adhesive may be applied at the time to the package. Transfer material is interposed between successive adjacent record leaves for transfer to the underlying leaves of inscriptions made upon the original leaves. Although this transfer material may be of any preferred form, it is shown in Fig. 1 as being coated upon the backs of the record leaves 5, 6 and 7 as indicated at 21. This transfer material will be disposed to transfer the inscriptions to the required parts of the blank forms and will be omitted at such parts of the blank forms as are not required to receive the transfer inscriptions.

In using the improved manifolding assembly, the inscriptions will be entered upon the original record leaf 5, either by hand or by the use of a writing machine, such inscriptions being transferred to the underlying record sheets by means of the transfer material. The duplicate record leaf 6 may be severed from the assembly along the weakened line 18 and handed to the shipper or other customer, or disposed of in any other desired manner. The original record leaf 5 may be severed from the assembly by severing its binding stub 10 along the weakened lines 11, or if this leaf is provided with a corresponding severance line as above suggested, it can be severed along this line. If the assembly is one of a multiplicity bound in a book as shown in Fig. 2, the stub 10 and original leaf 5 may remain attached in the book.

When the inscribed leaves 5 and 6 are thus detached from the assembly, inscribed leaves 7 and 8 still remain attached together by virtue of the attachments 13, 14, and 17 at the auxiliary or attaching stubs 16 and 19 positioned at the opposite edges or marginal portions of the assembly. These two attached leaves thus form a unitary assembly adapted for use as a label and provided with attaching stubs 16 and 19 at the opposite or remote edges thereof. The back surfaces of these stubs may now be provided with an adhesive, or the adhesive thereon moistened, after which they can be pressed into adhesive attachment with the surface of the package, article of merchandise, or the like. This label, as inscribed, includes the necessary data and instructions for transmittal of the article to its destination as may be desired. When the package reaches its destination, or at any other required time, the upper inscribed label leaf 7 may readily be detached by severance thereof from the attaching stubs along the respective weakened lines 15 and 18. The leaf 8 may be similarly detached when desired. One of these leaves may be handed to the consignee and the other retained by the transportation company. If additional inscribed leaves are included in the assembly, these may be disposed of for the purpose of accounting or for the correct handling of the shipment. Thus, there may be three or more leaves in the label unit, if desired, or three or more loose ended leaves.

According to the embodiment of Fig. 2, a multiplicity of manifolding units or assemblies such as described above in connection with Fig. 1, are bound together by the binding stubs 10 by means of binding staples 22 or similar known binding devices. Since the structure of each manifolding assembly shown in Fig. 2 is substantially the same as above described, corresponding parts are designated by the same reference numerals.

As shown, a cover 23 of any appropriate material such as flexible cardboard or manila is provided for the manifolding book thus constructed. As many manifolding units as desired may be bound by these covers by means of the binders 22. A multiplicity of such units are thus indicated at 24. The cover may, as shown, be provided with both back and front protective flaps, and attached thereto by means of a flexible connection 25 is an extension forming a flap or platen leaf 26, disposed to provide a support or writing table for each of the manifolding sets, in succession. The upper set in Fig. 2 is shown in inscribing position upon this support, although the leaves are separated for clearness of disclosure. When made up in this form, the manifolding sets may be used in the manner described above, except that the set should be inscribed before removal from the book. If it is desired to detach each set before inscription, such as when a writing machine is used, the upper or original leaf 5 should be attached to the attaching stub 16 and provided with a weakened severance line between such attachment and the stub 10.

In the form of Fig. 3 the assembly of record leaves is similar to the forms of Figs. 1 and 2 and corresponding parts are designated by the same reference numerals with the addition of the index "a". However, in this form, separate transfer leaves 27 and 28 are utilized, the leaf 27 being bound in the attaching stub 19a, while the leaf 28 is bound in the attaching stub 16a. Both of these transfer leaves are of the one-time type, that is, they are ordinarily of light material, with light coatings of transfer material, and intended to be used only for a single transfer inscription. In the embodiment shown, the leaf 27 has transfer material on both upper and lower surfaces thereof, while leaf 28 has transfer material only on its underneath surface. It is obvious that the attachment of these transfer leaves to the attaching stubs may be varied and that both may be attached to either stub. The leaf 28 need not extend to the binding stub 10a but only to the adhesive attachment 14a. It will be understood that the record leaf 6a will be translucent so that a transfer inscription made on the underside thereof by the double faced transfer leaf 27 may be read from the upper side of the record leaf. In case it is desired that the record leaf 5a be made the duplicate record leaf lying in contact with the transfer leaf 27, this record leaf will be made of translucent material.

In this form the two lower record leaves 7a and 8a together with the transfer leaf 28 form the label unit which is to be attached to the package or article in the manner above described in connection with Fig. 1. Although the leaves 7a and 8a are provided with weakened severance lines 15a, as above described, the transfer leaf 28 is not weakened at this point but remains of its full strength. Also, the opposite edge of the transfer leaf 28 is free and terminates short of the severance lines 18a. By means of this arrangement separation of the transfer leaf 28 from the record leaves is facilitated, after the record leaves 7a and 8a are detached along their respective severance lines 18a. The edges thus freed may be grasped together to the exclusion of the transfer leaf, whereupon these two record leaves may then be readily severed along the opposite weakened lines 15a, while the transfer leaf 28 remains attached to the attaching stub 16a. This is for the reason that the transfer leaf 28 is unweakened adjacent its attachment. The attachment of the transfer leaf 27 to the stub 19a may be accomplished in the same manner as the attachment of leaf 28, but in the embodiment shown, a transverse weakened severance line 29 is provided between the body of the leaf and attaching stub 19a. This transfer leaf, together with the record leaves 5a and 6a would ordinarily be detached from the assembly prior to attachment of the label unit to the package.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A manifolding assembly including, in combination, a plurality of attached record leaves with transfer material interposed therebetween for transfer inscription, one of said record leaves having attachment along one edge thereof into the assembly and having an opposite free swinging edge, and two of said leaves adjacent to each other having attachment with each other at two opposite marginal parts thereof, and having weakened severance lines positioned outside of one of said last mentioned attachments whereby said two leaves remain attached together at both of said marginal parts after severance thereof along said severance lines.

2. A manifolding assembly including, in combination, a plurality of attached record leaves with transfer material interposed therebetween for transfer inscription, one of said record leaves being an outside original leaf and having attachment along one edge thereof into the assembly and having an opposite free swinging edge, and two of said leaves adjacent to each other having attachment with each other at two opposite marginal parts thereof, said first mentioned attachment being adjacent to one of said second mentioned attachments, and said two adjacent attached leaves having weakened severance lines interposed between their bodies and each of said first and second mentioned attachments, and being attached together inside of certain of the severance lines.

3. A manifolding assembly including, in combination, a plurality of attached record leaves with transfer material interposed therebetween for transfer inscription, one of said record leaves having attachment along one edge thereof into the assembly and having an opposite free swinging edge, and two of said leaves adjacent to each other having attachment with each other at two opposite marginal parts thereof, said first mentioned attachment being adjacent to one of said second mentioned attachments, and said two adjacent attached leaves having weakened severance lines interposed between their bodies and each of said first and second mentioned attachments, and each having an additional weakened severance line spaced from the respective first mentioned line and with the latter defining an attaching stub for attaching said two adjacent leaves to an article.

4. A manifolding assembly including, in combination, a plurality of attached record leaves with transfer material interposed therebetween for transfer inscription, one of said record leaves having attachment along one edge thereof into the assembly and having an opposite free swinging edge, and two of said leaves adjacent to each other having attachment with each other at two opposite marginal parts thereof, said first mentioned attachment being adjacent to one of said second mentioned attachments, and said two adjacent attached leaves having weakened severance lines interposed between their bodies and each of said first and second mentioned attachments, and each having an additional weakened severance line spaced from the respective first mentioned line and with the latter defining an attaching stub for attaching said two adjacent leaves to an article, said two adjacent leaves being attached together between said weakened lines defining said attaching stub.

5. A manifolding assembly including, in combination, a plurality of attached record leaves with transfer material interposed therebetween for transfer inscription, an outer one of said record leaves having attachment along one edge thereof into the assembly and having an opposite free swinging edge, and two of said leaves adjacent to each other having attachment with each other at two opposite marginal parts thereof, and each having weakened severance lines between the body thereof and the said opposite marginal parts, and also having weakened severance lines outside of the attachment of one of the attached marginal parts.

6. A manifolding assembly including, in combination, a plurality of attached record leaves with transfer material interposed therebetween for transfer inscription, two of said record leaves having reversely arranged free swinging edges and having attachment with the assembly at their marginal portions opposite to said free edges, and two of said record leaves having attachment with each other at opposite marginal portions thereof and having weakened severance lines positioned outside of one of said attached marginal portions.

7. A manifolding assembly including, in combination, a plurality of attached record leaves with transfer material interposed therebetween for transfer inscriptions, one of said record leaves having attachment along one edge thereof into the assembly and having an opposite free swinging edge, and two of said record leaves having attachment with each other at opposite marginal portions thereof and having weakened severance lines positioned outside of one of said marginal portions, one of said two record leaves having a weakened severance line positioned between the body thereof and each of its attached marginal portions.

8. A manifolding assembly including, in combination, two relatively superposed record leaves having an extension forming a binding stub and having a weakened severance line positioned between said leaves and stub, said leaves having attachments with each other at opposite marginal portions thereof providing opposite auxiliary attaching stubs, one of said attaching stubs being adjacent to, but within said severance line, at least one of said record leaves having a weakened severance line positioned between the body thereof and each of said auxiliary attaching stubs.

9. A manifolding assembly including, in combination, a plurality of relatively superposed record leaves, and leaf attaching stubs positioned at remote marginal portions of the assembly in which a plurality of the record leaves have attachment and are supported at both remote marginal portions thereof, transverse severance lines being positioned respectively between the stubs and leaves and also being positioned both inside and outside of the attachment of one of said stubs.

10. A manifolding assembly including, in combination, a plurality of relatively superposed record leaves, leaf attaching stubs positioned at remote marginal portions of the assembly in which a plurality of the record leaves have attachment and are supported at both remote marginal portions thereof, transverse severance lines being positioned respectively between the stubs and leaves, and also being positioned both inside and outside of the attachment of one of said stubs and a transfer sheet bound at one edge portion in one of said attaching stubs.

11. A manifolding assembly including, in combination, a plurality of relatively superposed record leaves, leaf attaching stubs positioned at remote marginal portions of the assembly in which a plurality of the record leaves have attachment and are supported at both remote marginal portions thereof, transverse severance lines being positioned respectively between the stubs and leaves, and also being positioned both inside and outside of the attachment of one of said stubs and a transfer sheet bound at one edge portion in one of said attaching stubs, and having an opposite free edge terminating short of the opposite or remote weakened severance line and being unweakened adjacent to its attaching stub at points corresponding to the adjacent weakened lines of the record leaves.

EDWARD R. WILCOX.